A. F. KLEINSCHMIDT.
AUTOMOBILE INCLOSURE.
APPLICATION FILED MAY 22, 1916.
1,251,540.
Patented Jan. 1, 1918.
4 SHEETS—SHEET 2.
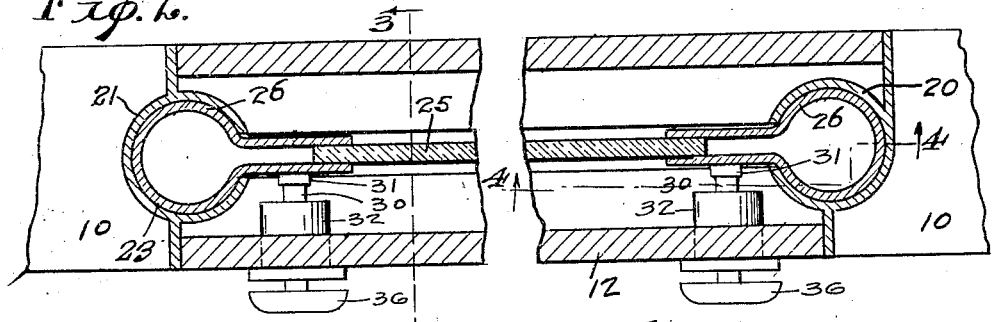
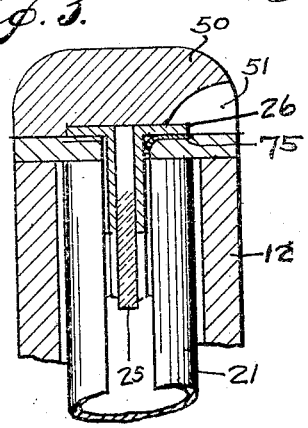
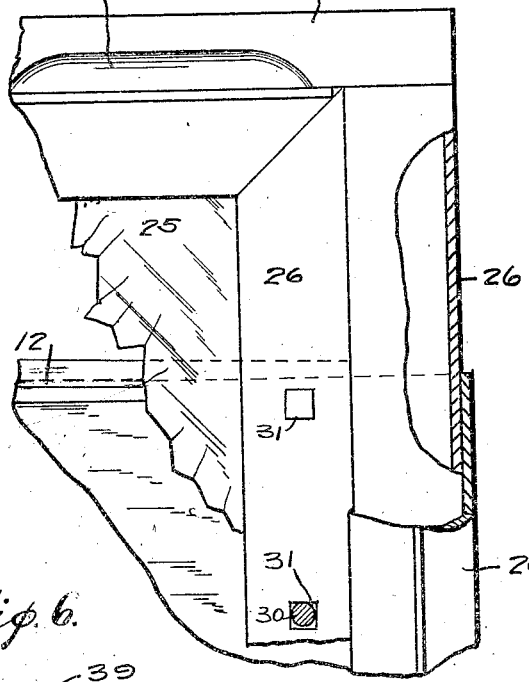
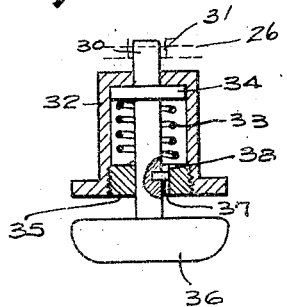
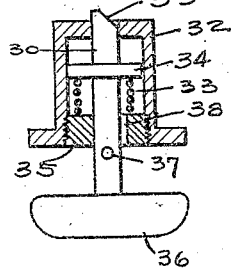
WITNESS
JH Swan
INVENTOR
Anthony F. Kleinschmidt
BY
Lockwood & Lockwood
ATTORNEYS

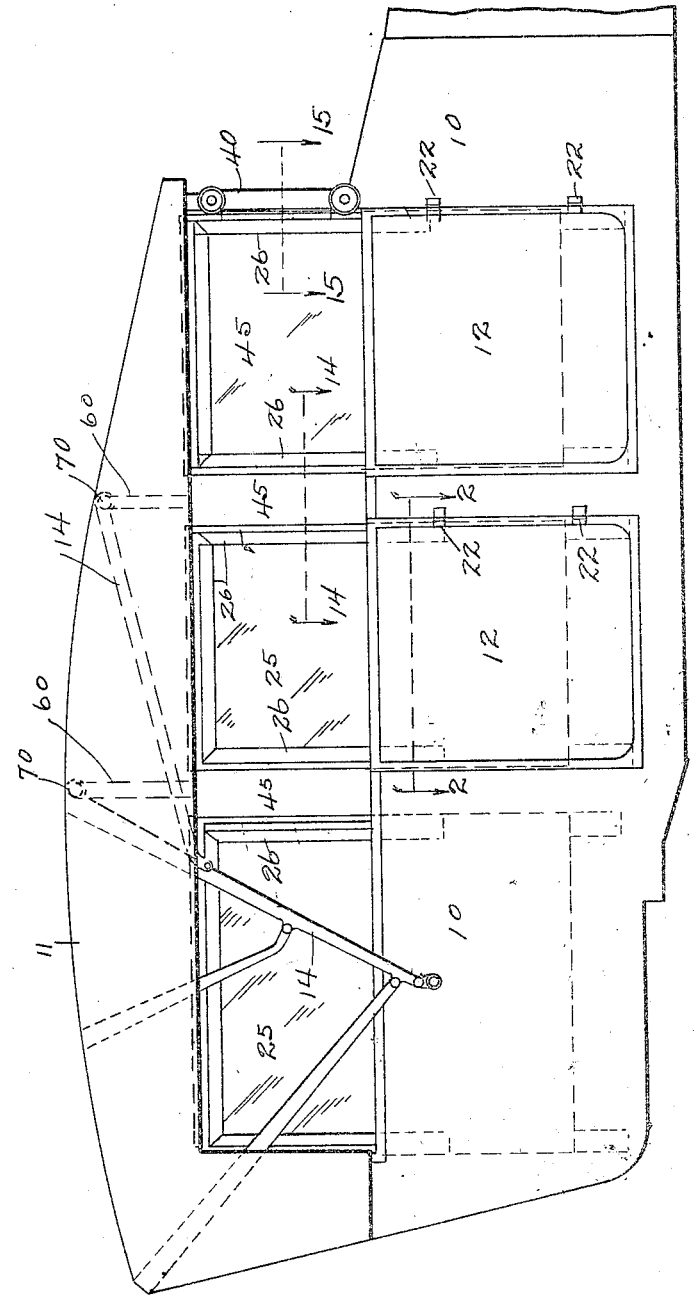

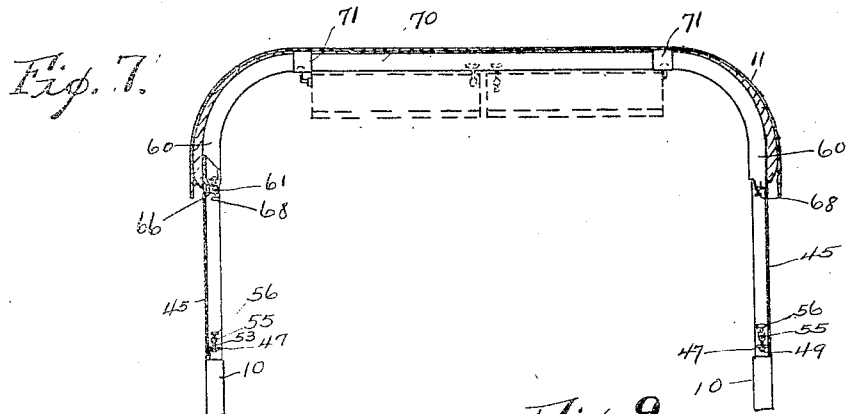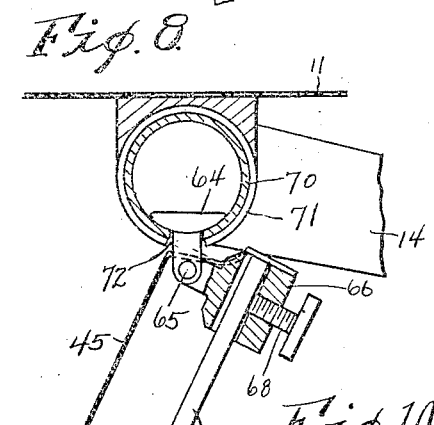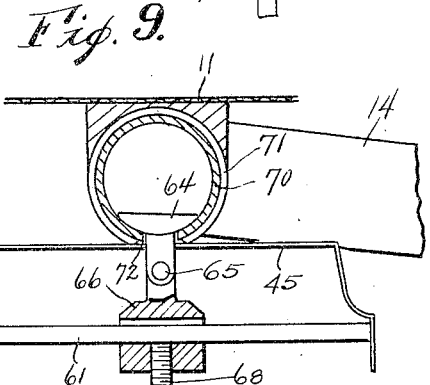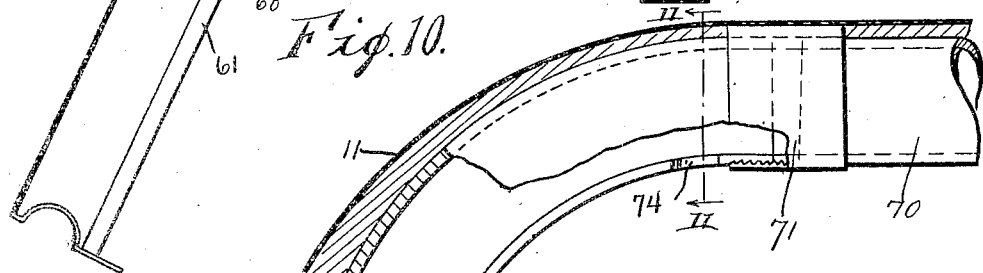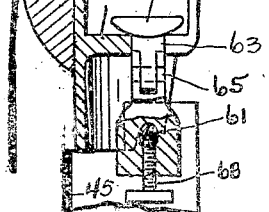

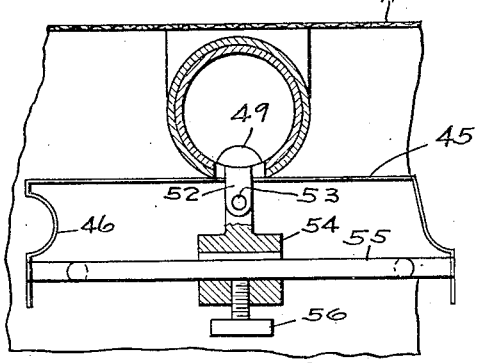
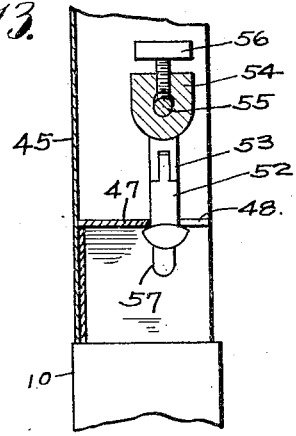
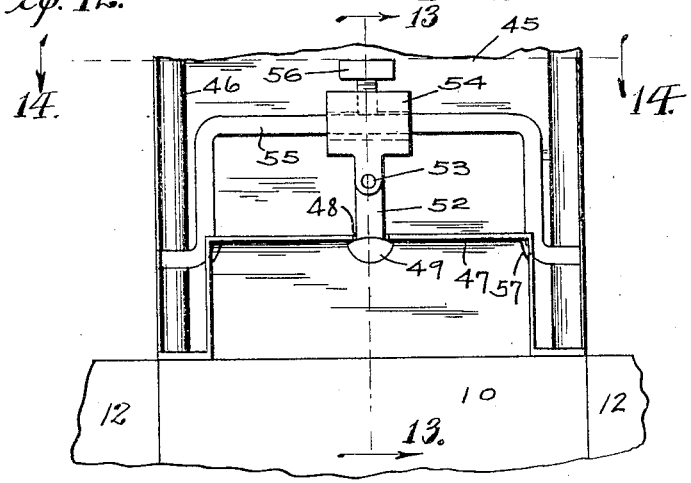
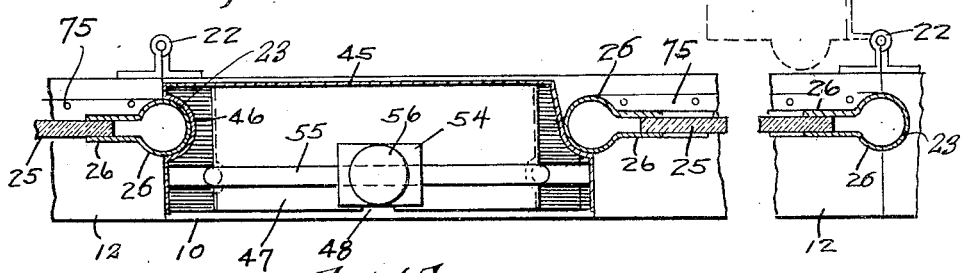
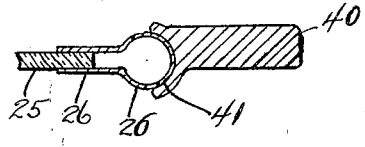

UNITED STATES PATENT OFFICE.

ANTHONY F. KLEINSCHMIDT, OF INDIANAPOLIS, INDIANA.

AUTOMOBILE-INCLOSURE.

1,251,540.  Specification of Letters Patent.  Patented Jan. 1, 1918.

Application filed May 22, 1916. Serial No. 99,103.

*To all whom it may concern:*

Be it known that I, ANTHONY F. KLEIN-SCHMIDT, a citizen of the United States, and a resident of Indianapolis, county of Marion, and State of Indiana, have invented a certain new and useful Automobile-Inclosure; and I do hereby declare that the following is a full, clear, and exact description thereof, reference being had to the accompanying drawings, in which like letters refer to like parts.

The object of this invention is to provide vertically extensible means, of a practical character, for closing the sides of automobile tops. The invention is adapted for use in connection with the ordinary automobile touring top which is made so as to be folded back out of the way at the rear end of the car when no top is desired. When cold or rainy, especially in the winter time, it is desirable that the automobile be completely inclosed and by means which enables the doors to be readily operated. This makes practically a combination limousine and touring car, as will appear from the following explanation.

One feature of the invention consists in providing vertically movable extensions for the doors and side walls of the body of the automobile for closing the sides of the top. These extensions are preferably made of glass in metal frames, which, when not in use, are pushed down into the doors and sides of the body of the automobile and out of the way. When in use, they are elevated so that they will extend to the top and be supported in their elevated position by suitable supporting means. If desired, they can be elevated to any intermediate point and supported in such position.

The arrangement also is such that these extensions when elevated will not interfere with the opening and closing of the door with which the same are associated.

Another feature of the invention consists in providing removable filler plates or intermediate means for closing the spaces between the extensions when in elevated position and means is provided in connection with the top for carrying said filler means when not in use, and said filler means can be brought down from said holding means through the instrumentality of guideways into position between the upward extensions from the doors or body of the automobile. This enables the sides of the automobile to be entirely inclosed and yet the means for closing the sides can be quickly and conveniently returned to their out-of-the-way positions and thus leave the sides of the top open and also enable the top to be folded back as is customary.

The full nature of the invention will be understood from the accompanying drawings and the following description and claims:

In the drawings, Figure 1 is a side elevation of an automobile body and top closed. Fig. 2 is a horizontal section through one of the doors, the same being shown on a relatively large scale and the intermediate portions broken away. Fig. 3 is a vertical section through a part of the device on the line 3—3 of Fig. 2. Fig. 4 is a section of a part of the device on the line 4—4 of Fig. 2, parts being broken away. Fig. 5 is a detail horizontal section of the means for holding the extension in the door, said means being in locking position. Fig. 6 is the same showing said means in released position. Fig. 7 is a vertical transverse section through the top and the upper part of the body, showing the top inclosed. Fig. 8 is a transverse section of the guideway and filler plate, showing the filler plate in its position when the top is ready to be folded back. Fig. 9 is the same with the filler plate in its position when the top is up but the sides of the automobile top are open. Fig. 10 is a vertical section transversely of the automobile top and showing one end of the guide for the filler plate and the upper part of the filler plate in its position when it is down between the extensions from the body of the automobile for inclosing the automobile. Fig. 11 is a section similar to that in Fig. 7, showing the guideway in section on the line 11—11 of Fig. 10, and the outer or lower end of the filler plate, such of the filler plate being shown in position to be detached from the guide. Fig. 12 is a side elevation of the lower end of the filler plate and adjacent part of the body when the filler plate is down and secured to the body. Fig. 13 is a vertical transverse section on the line 13—13 of Fig. 12. Fig. 14 is a horizontal section on the line 14—14 of Fig. 12, the section, however, being extended to include portions of the body, particularly one door which is centrally broken away and shown by dotted lines in open position. Fig. 15 is a section on the line 15—15 of Fig. 1.

There is shown herein the body 10 and the folding top 11 of an automobile with rear doors 12 and top frame 14. The general construction of these parts may be as usual, although some parts thereof are modified to adapt the same for the embodiment of this invention, as will hereafter fully appear.

The doors are hollow and each has vertical tubular guides 20 and 21, respectively, in the front and rear edges thereof, as indicated in Fig. 2. These guides are made of metal and the guide located in the edge next to the hinge 22 of the door projects for about half its thickness beyond the edge of the door so as to extend into a corresponding semi-circular recess 23 in the wall of the body of the automobile. This recess is a vertical groove-like recess. The construction of the wall of the body at the other edge of the door, or remote from the hinge and near the latch, not shown, is as shown in the right-hand end of Fig. 2, where, instead of the guide 20 extending into the semi-circular vertical groove of the body, it extends into a vertical groove which is substantially ninety degrees in cross section. That is for the purpose of enabling the door to be opened and closed. The vertical guides 20 and 21 not only serve the function hereafter mentioned with reference to guiding the vertical extension, but they also strengthen the position and mounting of the door in the body so as to make the door and body constructions much stronger and more durable than is found in the ordinary construction.

However, the chief function of the guides 20 and 21 in the doors and body of the automobile is to receive and guide the vertical extensions. These vertical extensions are formed of a central glass portion 25 and a lateral tubular metal molding or frame portion 26. In other words, the extension consists of the glass plate mounted in a metal frame, the metal frame having around it circular or tubular edges adapted to fit and operate in said tubular guides 20 and 21, so that the extension can be elevated or lowered.

There is shown in Fig. 1, at one side of the automobile, three of these vertical extensions, one for each door 12, and one for the rear part of the body of the automobile. They are preferably all constructed and arranged substantially the same excepting in dimensions. These extensions are supported in their elevated positions by spring bolts 30, shown in Figs. 2, 5 and 6. The inner end of the spring bolts projects into notches 31 in the metal frame 26 of the extension. Said bolts are mounted in casings 32 which are secured to and extend through the inner walls of the doors or body of the automobile. The bolts are held in their inward or engaging positions by springs 33 surrounding the bolts and each lying in said casing 32 and pressing against a collar 34 secured to the bolt toward its inner end and a nut 35 which screws into said casing 34, as shown in Fig. 5. The tendency of the spring, therefore, is to force and hold the bolt inward, the collar 34 serving as a stop to limit such inward movement.

When it is desired to move an extension down, the bolt 30 is withdrawn by a finger piece 36 which is accessible from the inside of the automobile, and when it is withdrawn, it is held in its outer and disengaging position by a pin 37 engaging the outer surface of the nut 35. The nut 35 has a groove 38 in it which permits the pin 37 to enter it when the bolt is turned into the position shown in Fig. 5. When the bolt is withdrawn, it is given a quarter turn so that said pin 37 will not register with the groove 38 and will hold the bolt open in its outer position. The inner end of the bolt is beveled at 39 at a point in such relation to the pin 37 that when the pin 37 is in the groove 38, the bevel 29 will be on the underside of the inner end of the bolt. This enables one to lift the extension upward without holding the bolt open, as the edges of the notches 31 will engage the beveled underside 39 of the bolt and force it back against the action of the springs. There are two of these bolts for each extension one near each side thereof, as shown in Fig. 2. The particular construction of this bolt is immaterial, as the invention is not limited to any particular means for holding these extensions in their upper positions, so long as said means is readily releasable and will perform the duty above outlined.

When the extensions are in their elevated position, as shown in Fig. 1, their upper ends will coöperate with the top so as to make proper inclosure. There is a longitudinal cap strip 50 secured along the upper edge of each extension so that when the extension is let down into its seat or recess in the door or body, the cap strip 50 will rest upon the top of the door or body and close the opening into the same and make the molding on the top of the door or body look well and present smooth surfaces. This arrangement is shown in Fig. 3. Suitable recesses 51 are made in the sides of said cap strips large enough to admit the ends of the fingers to enable one to lift the extension upward.

The upward extension from the front door 12 makes a rather tightly fitting joint with the wind shield support 40 in the same way that it does with the adjacent edges of the body, as shown at the right-hand of Fig. 15. Thus, as seen in Fig. 15, the wind shield frame has in it a vertical groove 41 in which the frame 26 of the extension moves and fits snugly.

The spaces between the vertical extensions are closed by vertically movable or adjustable filler plates 45 shown in the central part of Fig. 14. Each filler plate has a metal frame with a thickness substantially that of the door or body of the automobile and has along one vertical edge a semi-circular groove or recess 46 to receive and fit snugly with the corresponding edge of the frame 26 of the extension. The other vertical edge of the filler plate has a somewhat similar recess excepting that it is curved only ninety degrees instead of being semi-circular, so as to permit the extension opening and closing along with the door when the door is opened or closed. In other words, the lateral edges of these filler plates must be formed so as to correspond substantially with the corresponding edges of the body of the automobile with which said extensions coöperate when they are down in the lower positions.

When these filler plates are in use and are drawn down, they are fastened down to the upper edge of the body by the means shown in Fig. 12. There a metal holder 47 is secured upon the upper edge of the body of the automobile and has in it a transverse slot 48, as seen in Fig. 13, adapted to receive a head 49 on a bar 52 which is pivoted at 53 to a frame 54 on a bail-shaped bar 55, the ends of which are pivotally mounted in the edges of the filler plate. A set screw 56 in said frame 54 draws up the head 49 into tight engagement with the holder 47 which is secured to the body of the automobile. This makes a strong connection between the body of the automobile and the filler plate, and yet one which is readily releasable. In order to make this particular part of the construction more rigid, the lower inner bends of the bail 55 are seated in notches 57 in the upper corners of the holder 47.

The upper end of the filler plate is held in position in the lower part of a curved tube 60 secured to the top, as shown in Fig. 10. At the lower end of said tube there is a horizontal plate 161 with a slot 62 that is also continued throughout the length of the tube 60. Through said slot a bar 63 extends with a wide head 64 on its upper end resting on the plate 61 and the bar 63 at its lower end is pivoted by a pin 65 to a frame 66 on a cross bar 61 in and transversely of the filler plate 45 and said frame is clamped on said bar by a set screw 68.

The tube 60 referred to is segmental in form, as shown in Fig. 10, with its lower end free, excepting when secured to the upper end of the filler plate, as shown in Fig. 10. The upper end of the curved tube 60 is secured to a tube 70 which is secured stationary in the top like a rib or bow of an automobile top, and extends transversely thereof. The upper end of the curved tube 60 is coupled to the stationary cross tube 70 by a threaded coupling 71, see Fig. 10. This permits the lower end of the curved tube 60 to swing back into convenient position while the top is being folded, as at that time, as we shall see, the filler plate is not essential, with the curved tube 60. The stationary tube 70 at the top has a longitudinal slot 72 registering with a similar slot in the coupling 71 and the slot 62 in the curved tube 60. When it is desired to elevate the filler plates out of the way in order to open the sides of the automobile top, the lower part of the filler plate is released from the holder 47 and then the filler plate is elevated, the bar 43 being slid up vertically along the slot 62 in the curved tube 60 and along the slot in the coupling 71 and slot 72 in the tube 70 in which the bar 63 and head 64 have been pushed to a point near the top, as shown in Fig. 7. Then the head 49 on the lower end of the filler plate is inserted through a hole 74 in the upper end of the slot 62 and curved tube 60 and is pushed through the coupling 71 and into the tube 70 and is supported therein. For this purpose the slot 72 is made narrow as seen in Fig. 9, being narrower than the hole 74 and the head 49. When it is desired to bring down a filler plate, the same is slipped laterally until the head 63 will drop down through the hole 74 and through the lower end of the filler plate and then the upper part of the head 64 is slid longitudinally along the slots 60 and 72 down into the position shown in Fig. 10. The hole 74 is smaller than the head 64 so that the head can never escape.

The length of the filler plate is substantially half the width of the flat portion of the top, as shown in Fig. 7, so that the filler plate for the left side of the top will be supported by the left-hand end of the tube 70 and the filler plate for the other side by the other end of the tube 70. When these filler plates are in the position shown in Fig. 7, they will hang as shown in Fig. 9, which is a longitudinal section of the top and that is the normal position of the filler plates when the top is up, but the sides open. When it is desired to fold the top back, the screw 68 must be released and the filler plate pushed rearward into the position shown in Fig. 8, so that it is supported at its front edge and its other edge hangs free. Then it will lie back along with the folds of the top when the top is folded in the usual way.

As shown in Figs. 1 and 14, it is apparent from the foregoing description that when the sides of the automobile are closed, the construction is a very rigid and strong one and the doors are free to open for their full length like a limousine door. The guides 20 and 21 of the doors are seated in corresponding recesses in the edges of the body when the doors are closed, whereby the construction is greatly strengthened. Likewise the frames of the extensions are rounded and fit in circular guides 20 and 21 and also in semi-circular grooves in the wind shield support and in the edges of the filler plates. Consequently said extensions when in their upper and closing position are rigidly held in place by the interfitting of the adjacent parts. Each part reinforces the adjacent parts in order to give the desired strength and limousine effect of this construction.

When this invention is not needed, the extensions are let down into the doors and sides of the automobile out of the way and the rounded molding rests on the top edge thereof, and the filler plates are taken up into the top and, if desired, folded back with it so that they are likewise entirely out of the way. Since the lower edges of the top of the automobile are usually flexible flaps, the upper ends of the extensions, when elevated, will readily pass under them and normally be on the inside thereof so that the top flaps will shed the rain on the outside. To protect against rain when the extensions are elevated, flexible weather strips 75 are secured upon the doors and body of the automobile in position to engage the outer surfaces of the elevated extensions and shed the rain.

The invention claimed is:

1. The combination of the body of an automobile, a folding top therefor, rigid vertically telescoping extensions for closing the side spaces between the body and the top of the automobile, the side portions of the body being provided with telescoping tubes in which said extensions normally lie and the walls of which guide the extensions in their vertical movement, and means for supporting said extensions in their upper position.

2. The combination of the body of an automobile, a folding top therefor, vertically movable extensions for closing the side spaces between the body and top of the automobile, said extensions having central portions of glass and metal frames surrounding the glass, and the side portions of the automobile body having chambers for receiving said extensions when lowered and having vertical guideways for the lateral edges of said extensions, and releasable bolts mounted in the side portions of the automobile for engaging each lateral edge of each extension, said extensions having a series of notches in them to be engaged by said bolts.

3. The combination of an automobile body with a door opening, a door hinged thereto, an upwardly movable extension for said door, tubular guideways secured in said door and extending laterally beyond each lateral edge thereof, the adjacent edges of the automobile being recessed to receive said guideways of the door, circular frame members at the lateral edges of the extension adapted to fit and move vertically in said guideways, and means in connection with the door for supporting the extension in elevated position.

4. The combination of an automobile body having a front door opening, an upwardly movable extension therefor, said door having a chamber in it for receiving and holding said extension in its lower position and for guiding the same when moved upwardly and said extension being slightly wider than the door with its lateral edges projecting beyond the same, the body adjacent the forward edge of the door being provided with a vertical groove and guideway for the forward edge of the upward extension, and a wind shield support with a vertical groove in the rear surface thereof which is in vertical alinement with the groove in the body, so as to serve as a guide for the forward edge of said extension when in its elevated position.

5. The combination of an automobile body having door openings in the side thereof spaced apart, a folding top for the automobile, a rigid extension mounted in connection with each door so as to be vertically movable up to the top of the automobile, and a rigid filler plate for closing the space between said extensions when in their upper positions, the lateral edges of said filler plate being grooved longitudinally thereof for receiving and holding the adjacent edges of the extensions when in their upper positions.

6. The combination of an automobile body having door openings in the side thereof spaced apart, a folding top for the automobile, a rigid extension mounted in connection with each door so as to be vertically movable up to the top of the automobile, a rigid filler plate for closing the space between said extensions when in their upper positions, a tubular construction secured to the top and extending transversely and having a longitudinal slot in the lower and underside thereof and the outer ends of said tubular construction being curved downward and having a slotted space across their lower ends, and headed projections extending from the ends of said filler plate adapted to extend through said slot and be moved along said tubes and supported thereby.

7. The combination of an automobile body having door openings in the side thereof spaced apart, a folding top for the automobile, a rigid extension mounted in connection with each door so as to be vertically movable up to the top of the automobile, a rigid filler plate for closing the space between said extensions when in their upper positions, a tubular construction secured to the top and extending transversely and having a longitudinal slot in the lower and underside thereof and the outer ends of said tubular construction being curved downward and having a slotted space across their lower ends, head projections extending from the ends of said filler plate adapted to extend through said slot and be moved along said tubes and supported thereby, the head on the projection at the lower end of said filler plate being smaller than the head on the projection at the upper end thereof, and an enlargement in the slot in the upper end of the curved portion of said guide so that the headed projection on the lower end of said filler plate can be disengaged from the guide as the filler plate is being moved down in position for use while the headed projection on the upper end of said filler plate will be held in the lower end of said tubular construction.

8. The combination of an automobile body having door openings in the side thereof spaced apart, a folding top for the automobile, a rigid extension mounted in connection with each door so as to be vertically movable up to the top of the automobile, a rigid filler plate for closing the space between said extensions when in their upper positions, a rigidly mounted tube in the underside of the top and extending transversely thereof and longitudinally slotted on the underside, a curved tube at each end of said first-mentioned tube and with slots in the underside thereof, the adjacent ends of said tubes being threaded, and a coupling sleeve for coupling the adjacent ends of said tubes together so that the lower ends of the curved tubes will be free in order that the top may be folded back.

9. The combination of an automobile body having door openings in the side thereof spaced apart, a folding top for the automobile, a rigid extension mounted in connection with each door so as to be vertically movable up to the top of the automobile, a rigid filler plate for closing the space between said extensions when in their upper positions, a tubular guideway secured to the top with a slot along the lower side thereof, a cross bar on the upper end of the filler plate, a frame slidable on said cross bar, a set screw for clamping it to the cross bar in adjusted position, and a headed projection from said frame that extends into the slot in said guide, whereby said filler plate may be moved along said guide and be supported thereby and when it is desired to fold the top, the connection between said headed projection and the filler plate may be readjusted to enable the filler plate to fold properly in with said top.

In witness whereof, I have hereunto affixed my signature.

ANTHONY F. KLEINSCHMIDT.